(12) United States Patent
D

(10) Patent No.: US 9,606,969 B1
(45) Date of Patent: Mar. 28, 2017

(54) RESIZING CONTENT IN A CURRENT VIEW OF A WEB BROWSER BASED ON A MINIMUM FONT SIZE INPUTTED BY A USER

(71) Applicant: Symantec Corporation, Mountain View, CA (US)

(72) Inventor: Rajesh Kumar D, Chennai (IN)

(73) Assignee: Symantec Corporation, Mountian View ( * ) Notice: Subject to any disclaimer, the term of this patent is extended or adjusted under 35 U.S.C. 154(b) by 493 days.

(21) Appl. No.: 13/859,312

(22) Filed: Apr. 9, 2013

(51) Int. Cl.
*G06F 17/21* (2006.01)
*G06F 17/22* (2006.01)

(52) U.S. Cl.
CPC .......... *G06F 17/214* (2013.01); *G06F 17/211* (2013.01); *G06F 17/2247* (2013.01)

(58) Field of Classification Search
CPC ... G06F 17/214; G06F 17/211; G06F 17/2247
See application file for complete search history.

(56) References Cited

U.S. PATENT DOCUMENTS

| | | | | |
|---|---|---|---|---|
| 8,543,914 | B2 * | 9/2013 | Klassen | ........................ 715/269 |
| 2003/0095135 | A1 * | 5/2003 | Kaasila | ................ G06F 3/0481 345/613 |
| 2008/0225306 | A1 * | 9/2008 | Shepherd et al. | ............. 358/1.2 |
| 2009/0189904 | A1 * | 7/2009 | Roth | .............................. 345/467 |
| 2010/0199195 | A1 * | 8/2010 | Carounanidy et al. | ........ 715/760 |
| 2012/0110438 | A1 * | 5/2012 | Peraza | .................. G06F 17/214 715/243 |

OTHER PUBLICATIONS

"Environmental Variable" Mar. 3, 2012 pp. 1-2.*
Perera, Gilberto, "How to change the Email Font Size on the iPhone" Jun. 14, 2011, pp. 1-3.*

* cited by examiner

*Primary Examiner* — Cesar Paula
*Assistant Examiner* — Benjamin Norris
(74) *Attorney, Agent, or Firm* — Patent Law Works LLP

(57) ABSTRACT

A minimum font size to display for a specific user is received, for example as entered through a user interface. The retrieval of webpages by a web browser on a computer system is monitored. For each specific view of a retrieved webpage to be displayed, the text in the specific view is resized based on the minimum font size for the user. Text in the smallest font in the view is resized to the minimum font size for the specific user. Larger text is resized so that the proportionality between different font sizes in the view is maintained. The view of the retrieved webpage with the resized text is displayed to the user. As the user scrolls through a retrieved webpage, the text of each view is resized, and the current view of the retrieved webpage is displayed with the resized text.

16 Claims, 4 Drawing Sheets

RESIZING CONTENT IN A CURRENT VIEW OF A WEB BROWSER BASED ON A MINIMUM FONT SIZE INPUTTED BY A USER

TECHNICAL FIELD

This disclosure pertains generally to web browsing technologies, and more specifically to customizing the size of displayed web browser content for users at a view-based level.

BACKGROUND

Users face difficulties in reading textual web content displayed through their browsers when the font size of the content is small. This problems is especially prevalent on mobile computing devices such as smartphones. Mobile computing devices typically have smaller screens than stationary computers, and thus mobile browsers tend to use smaller fonts to display web content.

A single web site can contain content that includes multiple font sizes. The ranges of font sizes used also vary from site to site. Compounding these issues, different users prefer reading fonts of different sizes. Whereas some users might be perfectly comfortable reading relatively small fonts (e.g., 8 point), other users have different standards and tolerances for the font size they are most comfortable reading (e.g., 12 point, 18 point, etc.), based on eye sight, personal preference and other factors.

Some conventional web browsers support zooming in and out, thereby allowing the user to increase and decrease the displayed size of the content currently on the screen. This can be useful for reading a specific block of text that is too small to view comfortably, but because the text size varies on individual web sites, the user must keep zooming in and out while scrolling through the site. When the user then browses to a different site, the user is again required to keep adjusting the level of magnification provided by the zoom feature to maintain the desired font size while scrolling through displayed text on that site. The need to keep adjusting the level of zoom is not convenient, and is generally burdensome on the user.

Some conventional browsers also allow users to set a minimum font size option, which then adjusts the text of a web page such that the smallest font on the page is displayed at the specified minimum size, and larger fonts are displayed at larger sizes. However, because parts (often the majority) of a given page are not visible on the screen at any given time, the specified minimum font size is often applied to a font not currently on the screen (i.e., the smallest font in the page). When this occurs, all of the fonts that are currently displayed are increased to a size above the minimum, thus resulting in screenfulls of text where all the displayed fonts are larger than necessary. This wastes screen space, and has the effect of displaying less of the web page at a time than the user actually wants, based on the user's desired font size.

It would be desirable to address these issues.

SUMMARY

The size of content displayed by a web browser at a view-based level is customized, based on user preference. In some embodiments, this functionality is instantiated in the form of a web browser add-on. A minimum font size to display for a specific user is received. For example, the specific user can be prompted to enter the desired minimum font size, through a user interface. This prompting can take the form of displaying text in a range of font sizes, and directing the user to select a desired minimum font size from the displayed options. In one embodiment, the user is instead prompted to enter a desired selection from a non-numerical range of text sizes (e.g., small, medium, large, etc.). The selection made by the user is then automatically converted into a corresponding minimum font size to display. In other embodiments the minimum font size to display for a specific user is retrieved in other ways, such as from a configuration file, a user profile, an environment variable, etc. In one embodiment, a plurality of separate minimum font sizes to display are maintained and utilized, wherein each separate minimum font size is associated with a separate user, for example under an operating environment that supports multiple users logging-in to the same computer system.

The retrieval of webpages by the web browser on the computer system is monitored. For each specific view of a retrieved webpage to be displayed, the text in the specific view is resized based on the minimum font size for the user. Text in the smallest font in the view is resized to the minimum font size for the specific user. Text in the view that is not in the smallest font (i.e., larger text) is resized so that the proportionality between different font sizes in the view is maintained. The view of the retrieved webpage with the resized text is displayed to the user.

To resize text in one embodiment, all of the text in the current view of the retrieved webpage is examined, and new font sizes for the text in the view are dynamically calculated, based on the minimum font size to display for the specific user. In one embodiment, a new size for each specific font of text in the view is calculated according to the formula: new size of specific font=(original size of specific font/original smallest font size in specific view)*minimum font size to display for specific user. As the user scrolls through a retrieved webpage, the text of each view is resized, and the current view of the retrieved webpage is displayed with the resized text. Responsive to the received minimum font size to display being smaller than the smallest font in a specific view, the text size can be decreased. The text size in a specific view can also be left unchanged responsive to the received minimum font size to display being smaller than or equal to the smallest font in the view.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
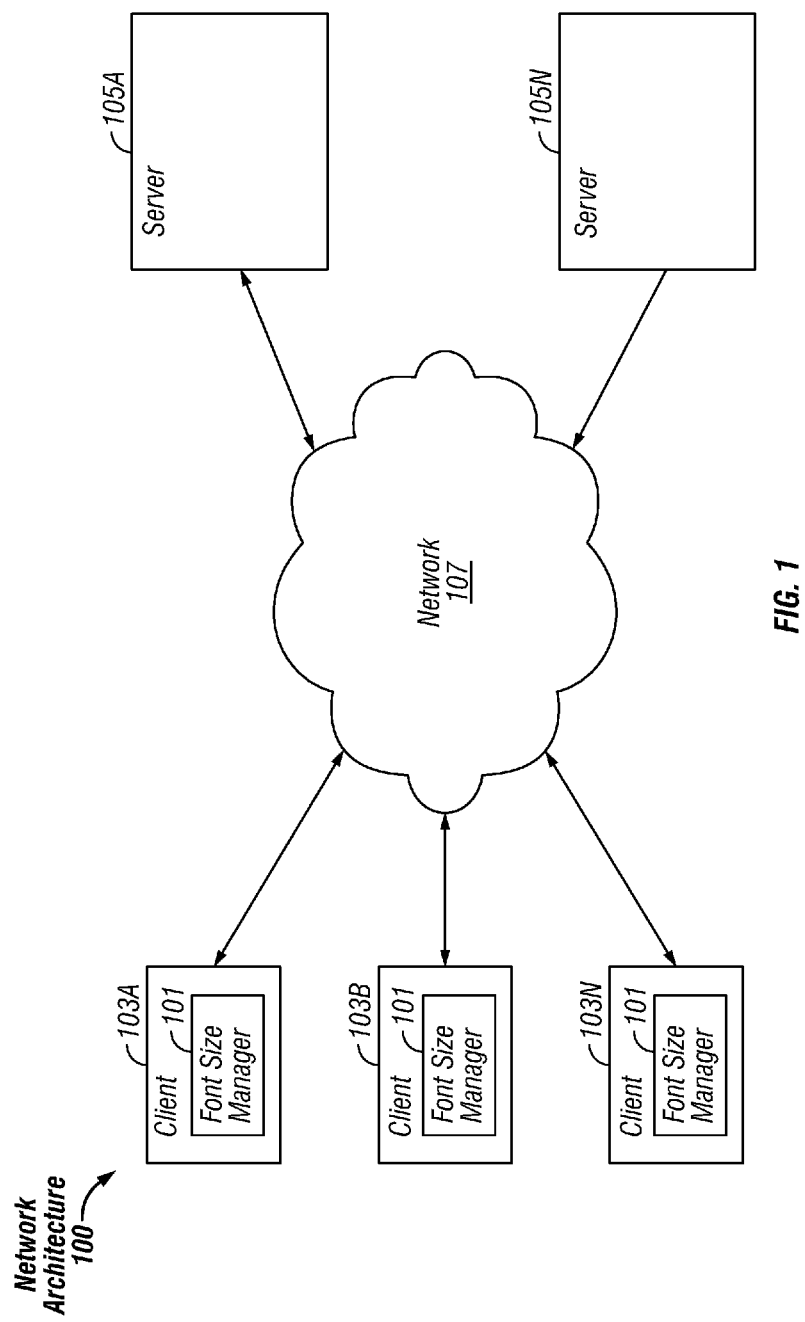
FIG. 1 is a block diagram of an exemplary network architecture in which a font size manager can be implemented, according to some embodiments.

FIG. 1 is a block diagram illustrating an exemplary network architecture 100 in which a font size manager 101 can be implemented. The illustrated network architecture 100 comprises multiple clients 103A, 103B and 103N, as well as multiple servers 105A and 105N. In FIG. 1, a font size manager 101 is illustrated as residing on each client 103A, 103B and 103N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
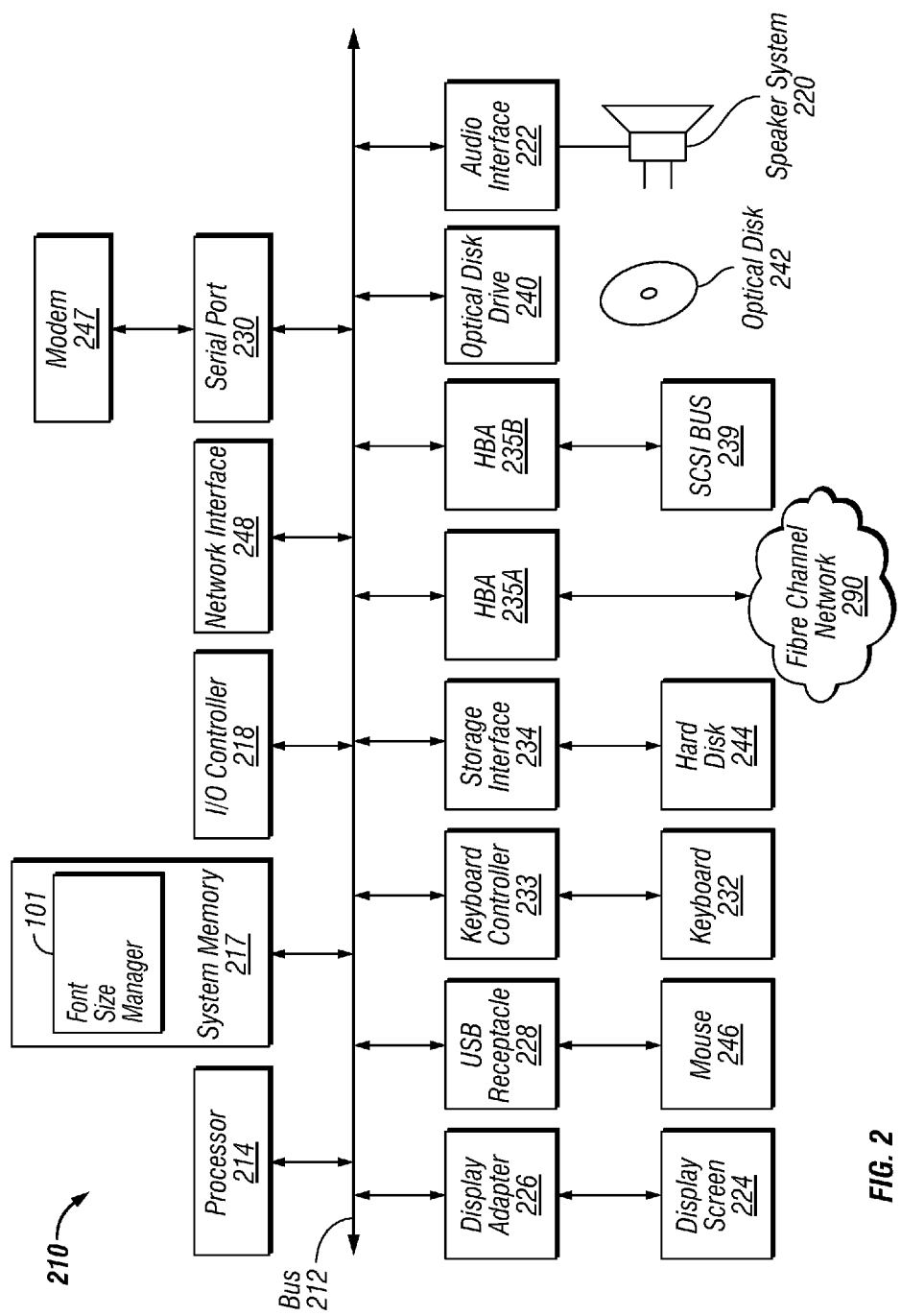
FIG. 2 is a block diagram of a computer system suitable for implementing a font size manager, according to some embodiments.

FIG. 2 is a block diagram of a computer system 210 suitable for implementing a font size manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the font size manager 101 is illustrated as residing in system memory 217. The workings of the font size manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
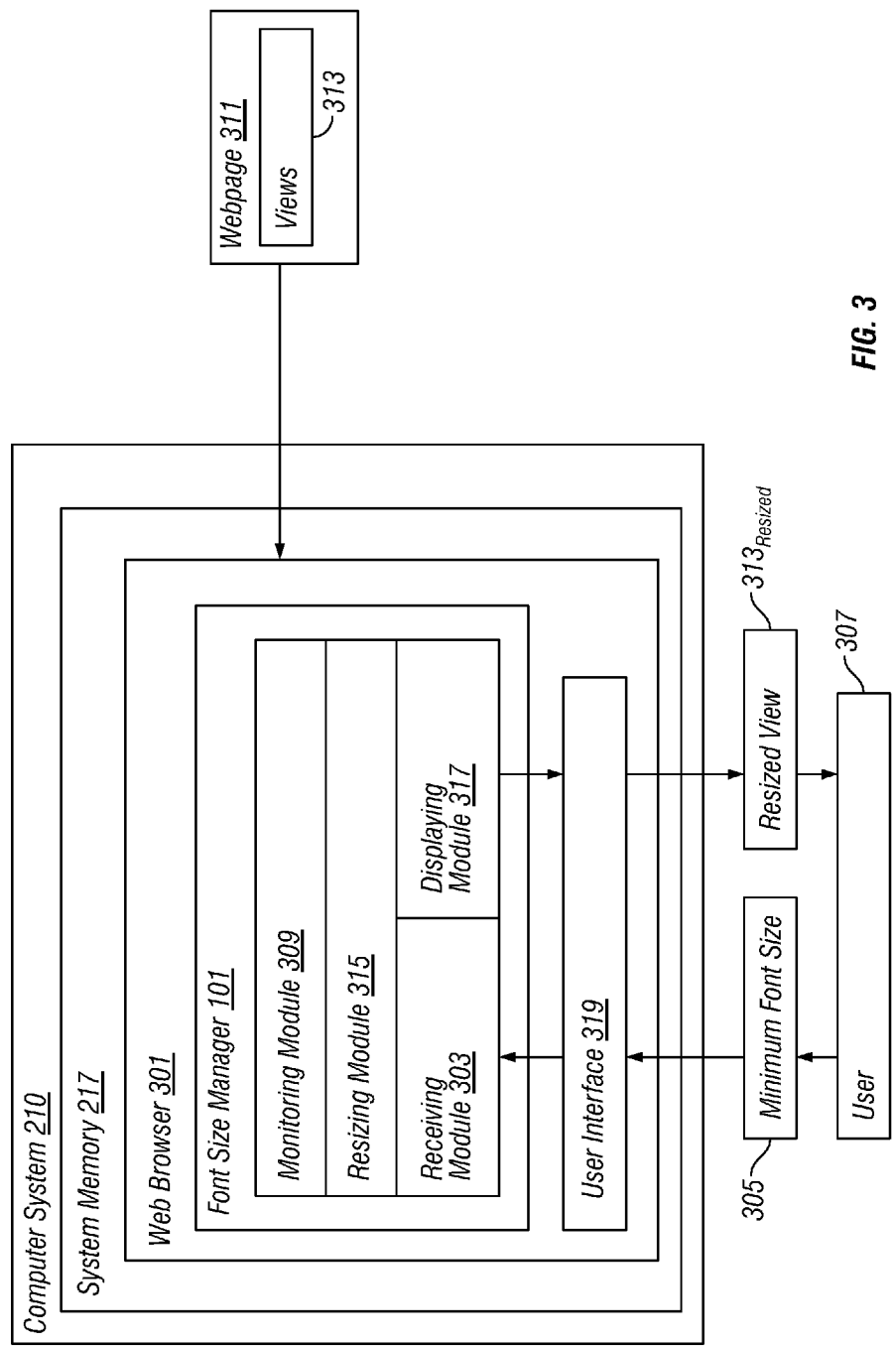
FIG. 3 is a block diagram of the operation of a font size manager, according to some embodiments.

FIG. 3 illustrates a font size manager 101 running in the system memory 217 of a computer system 210, according to some embodiments. As described above, the functionalities of the font size manager 101 can reside on a client 103 (including but not limited to a client 103 in the form of a mobile computing device), a server 105, or be distributed between multiple computer systems 210, including within a cloud-based computing environment in which the functionality of the font size manager 101 is provided as a service over a network 107. It is to be understood that although the font size manager 101 is illustrated in FIG. 3 as a single entity, the illustrated font size manager 101 represents a collection of functionalities, which can be instantiated as a single or multiple modules on one or more computing devices 210 as desired. FIG. 3 illustrates a specific embodiment in which the font size manager 101 is instantiated in the form of specific, multiple modules. In other embodiments, the functionalities of the font size manager 101 are distributed and/or instantiated in other ways. It is to be understood that the modules of the font size manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the font size manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In one embodiment, the font size manager 101 is instantiated as an add-on (e.g., a plug-in, a helper object, or the like) that works in conjunction with the web browser 301 on the computer system 210. In other embodiments, the font size manager 101 works in conjunction with the web browser 301, without being implemented as an actual add-on. The term "web browser" is used herein according to its plain and ordinary meaning, i.e., a software application capable of allowing users 307 to access, retrieve and view webpages 311 from the Internet (or from other networks 107 such as a private intranet). Examples of current web browsers 301 include Internet Explorer®, Google Chrome®, Firefox®, Safari® and Opera®. Some web browsers 301 are optimized for mobile computing devices 210, such as Android Browser®, Blackberry Browser®, Kindle Basic Web®, Firefox for Mobile®, etc. These browsers 301 are sometimes referred to as mobile browsers 301 or micro browsers 301. In some embodiments, the font size manager 101 can work in conjunction with other applications that provide webpage 311 access, but are not typically thought of as browsers 301, such as a standalone web feed reader, the webpage 311 retrieving and displaying functionality embedded in a third party application (e.g., Microsoft Outlook® or a similar package from another vendor), etc.

A receiving module 303 of the font size manager 101 can receive a minimum font size 305 to display for the user 307 of the computing device 210. For example, the receiving module 303 can prompt the user 307 to enter a desired minimum font size 305 through a user interface 319 (e.g., that of the web browser 301 as illustrated, or a separate user interface 319 provided by the font size manager 101). In one embodiment, the receiving module 303 prompts the user 307 by displaying text in a range of font sizes (for example, 6-22 point in two point increments), and directs the user 307 to select the desired minimum font size 305 from the displayed options. In other words, a specific sample of text can be displayed in multiple sizes, from which the user 307 can pick the desired minimum font size 305 in which text is to be displayed when viewing webpages 311. In other embodiments, the user 307 can instead be prompted to select a desired minimum font size 305 from a user interface component such as a pull down menu, or to enter a number into a dialog box or the like. In another embodiment, the user 307 can be prompted to enter a selection from a non-numerical range of text sizes (e.g., very small, small, medium, large, extra large, etc.), and the user's selection is automatically converted into a corresponding minimum font size 305 (e.g., very small=8 points, small=10 points, medium=12 points, etc.). In some embodiments, a default minimum font size 305 is used until the user 307 has provided a selection. The specific value of the default size to use can vary between embodiments. The user's selection can also be retrieved in ways other than via a user interface 319, for example from a configuration file, a user profile, an environment variable, etc. Some embodiments support saving and using separate minimum font sizes 305 for different users 307, for example in operating environments that support allowing multiple users 307 to login to the same computer system 210.

In different embodiments, the exact standard used for point sizes of fonts can vary (e.g., the PostScript standard of 72 points to the inch, Fournier fonts of 0.345 millimeters per point, the French national Print Office standard of 0.4 millimeters per point, etc.). Font sizes can also be measured in units other than points, for example the standard Chinese font size measurements of (in order from larger to smaller) initial, small initial, one, small one, two, small two, three, small three, four, small four, five, small five, six, small six, seven and eight.

Once a minimum font size 305 to display has been established, a monitoring module 309 of the font size manager 101 monitors the retrieval of webpages 311 by the web browser 301. For each view 313 of each webpage 311 to be displayed to the user 307 by the browser 301, a resizing module 315 of the font size manager 101 resizes the content based on the minimum font size 305 as described in detail below. As used herein the term view 313 of a webpage 311 means the content to be displayed by the browser 301 while at a current scrolled position in the webpage 311.

In order to resize webpage 311 content based on the minimum font size 305, the resizing module 315 dynamically calculates the font sizes for the text in the current view 313 of the webpage 311, based on the minimum font size 305 to display for the user. To do so, the resizing module 315 examines all of the text in the current view 313, and resizes the text that is in the smallest font size therein to be the minimum font size 305, for comfortable reading by the user 307. For example, if the smallest font size present in the view is 8 point and the user's specified minimum font is 18 point, the 8 point text is resized to 18 point text. The resizing module 315 also proportionally resizes the text in the view 313 that is not of the smallest font size, so that the proportions between the font sizes in the view 313 of the webpage 311 are maintained, thereby preserving the intended look and feel of the webpage 311 while still enabling the user 307 to view the webpage 311 comfortably based on desired minimum font size 305.

For example, the resizing module 315 can proportionally calculate the new sizes for any number of fonts appearing in the view 313 such that the original smallest size is set to the minimum size to display by applying the following function: for each font size X in the view 313, new size (X)=(original size X/original smallest font size in view)*user desired minimum font size to display. Take as an example a view 313 that contains three sizes of text, wherein size 1=8 point, size 2=10 point and size 3=12 point. Assuming the user's specified minimum font size 305 to display is 18 point, the three sizes of text in the view could be resized according to the above-given function as follows: (8/8)*18=18, (10/8)*18=22.5 and (12/8)*18=27. Thus, the three fonts in the view 313 would be resized to 18 point, 22.5 point and 27 point. As a second example, assume that a given view 313 contains text in two font sizes, 12 point and 18 point, and the user 307 has specified the minimum font size 305 to be 14 point. Applying the resizing function then gives us (12/12)*14=14 and (18/12)*14=21. The fonts would thus be resized to 14 and 21, thereby setting the smallest font in the view 303 to the minimum font size 305, and yet maintaining the original size proportionality between the fonts in the view 313. In other words, the font size manager transforms the original view $313_{original}$ into an optimized view $313_{optimized}$, in which the smallest font size is equal to the user specified minimum font size 305, and the remaining fonts are resized proportionally. It is to be understood that in other embodiments, the exact function or formula to use can vary, for example to account for factors such as tolerated margins of error in the preservation of the proportionality between original and resized fonts, rounding methodology, etc.

A displaying module 317 of the font size manager 101 displays the view 313 with the resized text (i.e., the optimized view $313_{resized}$) to the user 307, typically via the user interface 319 of the web browser 301, thereby allowing the user 307 to comfortably read the content. As the user 307 scrolls through a webpage 311, the resizing manager 315 continues to identify original sizes of the text in the current view 313, and resize it based on the desired minimum font size 305 as described above. The displaying module 317 then displays the resulting optimized view $313_{resized}$, thereby providing the user 307 with displayed webpage 311 content that s/he does not find too small to read, based on a personalized preference of desired font size.

Note that in one embodiment, where the specified minimum font size 305 is smaller than smallest font in a view 313, the resizing module 315 can actually decrease the size of the text. For example, assume a scenario in which a view 313 contains 14 and 21 point fonts, and the user's desired minimum font size is 12. Applying the resizing function given above results in 14/14*12=12 and 21/14*12=18. Thus, the 14 and 21 point fonts would be resized to 12 and 18 points respectively. In another embodiment, when the specified minimum font size 305 is smaller than smallest font in a view 313, the text in the view is simply left as is (i.e., not changed) rather than decreased in size. Typically, where the smallest font size in a view 313 is equal to the user specified minimum font size 305, the text in that view 313 is left alone (i.e., the fonts sizes are not changed under these circumstances).

Figure 4:
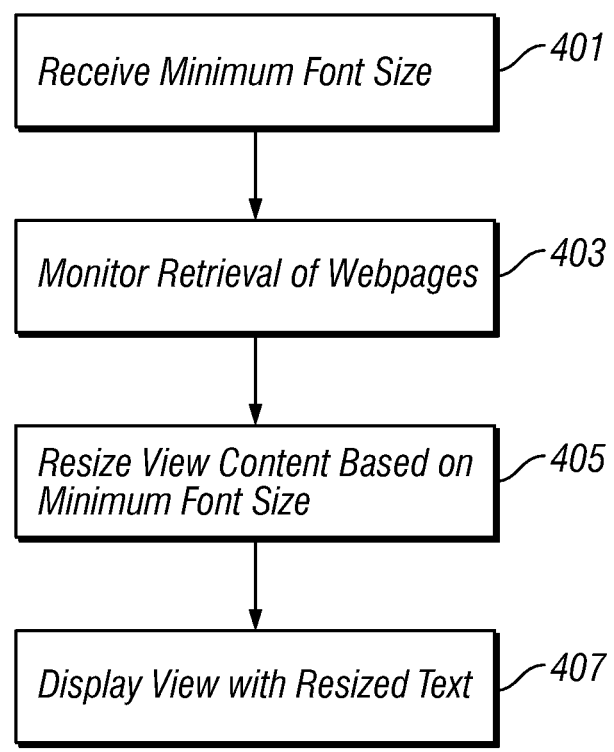
FIG. 4 is a flowchart illustrating steps of the operation of a font size manager, according to some embodiments.

FIG. 4 illustrates steps of the operation of a font size manager 101, according to some embodiments. The receiving module 303 receive 401 a minimum font size 305 to display for a specific user 307, for example via the user interface 319 of the web browser 301. The monitoring module 309 monitors 403 the retrieval of webpages 311 by the web browser 301. For each specific view 313 of each retrieved webpage 311 to be displayed, the resizing module 315 resizes 405 the content based on the minimum font size 305 for the user 307, so that text in a smallest font in the view 313 is resized to the minimum font size 305 for the user 307, and text in larger font sizes in the view 313 is resized so that proportionality between different font sizes in the view 313 is maintained. The displaying module 317 displays 407 the view $313_{resized}$ with the resized text to the user 307, for example via the user interface 319 of the web browser 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for customizing the size of content displayed by a web browser at a view-based level based on user preference, the method comprising the steps of:
   receiving a minimum font size to display for a specific user;
   monitoring retrieval of webpages by the web browser on a computer system, wherein a retrieved webpage comprises multiple views, wherein a view of a webpage comprises content to be displayed by the browser while at a current scrolled position in the webpage;
   prior to displaying a specific view of the retrieved webpage, resizing text in the specific view by examining all of the text in the specific view of the retrieved webpage and dynamically calculating font sizes for the text in the specific view of the retrieved webpage based on the minimum font size for the specific user, so that size proportionality between different font sizes in the specific view is maintained;
   displaying the specific view of the retrieved webpage with the resized text to the specific user; and
   as the specific user scrolls to additional views of the retrieved webpage, prior to displaying each specific additional view, resizing text in the specific additional view based on the minimum font size, and displaying the specific additional view of the retrieved webpage with the resized text to the specific user.

2. The method of claim 1 wherein receiving a minimum font size to display for a specific user further comprises:
   prompting the specific user to enter a desired minimum font size through a user interface.

3. The method of claim 1 wherein receiving a minimum font size to display for a specific user further comprises:
   displaying text in a range of font sizes; and
   directing the specific user to select a desired minimum font size from the displayed font sizes.

4. The method of claim 1 wherein receiving a minimum font size to display for a specific user further comprises:
   prompting the specific user to enter the selection from a non-numerical range of text sizes; and
   automatically converting a selection made by the specific user into a corresponding minimum font size to display.

5. The method of claim 1 wherein receiving a minimum font size to display for a specific user further comprises:
   retrieving the minimum font size to display for the specific user from a source from a group of sources consisting of: a configuration file, a user profile and an environment variable.

6. The method of claim 1 wherein resizing text in the specific view based on the minimum font size for the specific user further comprises:
   calculating a new size for each specific font in the specific view according to the following formula: new size of specific font=(original size of specific font/original smallest font size in specific view)*minimum font size to display for specific user.

7. The method of claim 1 further comprising:
   decreasing text size in a specific view of the retrieved webpage, responsive to the received minimum font size to display being smaller than the smallest font in the specific view.

8. The method of claim 1 further comprising:
   not changing text size in a specific view of the retrieved webpage, responsive to the received minimum font size to display being smaller than or equal to the smallest font in the specific view.

9. The method of claim 1 further comprising:
   maintaining and utilizing a plurality of separate minimum font sizes to display, wherein each separate minimum font size to display is associated with a separate user.

10. The method of claim 1 wherein:
at least the resizing step is performed by a web browser add-on.

11. At least one non-transitory computer readable-storage medium for customizing the size of content displayed by a web browser at a view-based level based on user preference, the at least one non-transitory computer readable-storage medium storing computer executable instructions that, when loaded into computer memory and executed by at least one processor of a computing device, cause the computing device to perform the following steps:
receiving a minimum font size to display for a specific user;
monitoring retrieval of webpages by the web browser on a computer system, wherein a retrieved webpage comprises multiple views, wherein a view of a webpage comprises content to be displayed by the browser while at a current scrolled position in the webpage;
prior to displaying a specific view of the retrieved webpage, resizing text in the specific view by examining all of the text in the specific view of the retrieved webpage and dynamically calculating font sizes for the text in the specific view of the retrieved webpage based on the minimum font size for the specific user, so that size proportionality between different font sizes in the specific view is maintained;
displaying the specific view of the retrieved webpage with the resized text to the specific user; and
as the specific user scrolls to additional views of the retrieved webpage, prior to displaying each specific additional view, resizing text in the specific additional view based on the minimum font size, and displaying the specific additional view of the retrieved webpage with the resized text to the specific user.

12. The at least one non-transitory computer readable-storage medium of claim 11 further storing computer executable instructions to perform the following additional step:
prompting the specific user to enter a desired minimum font size through a user interface.

13. The at least one non-transitory computer readable-storage medium of claim 11 further storing computer executable instructions to perform the following additional step:
retrieving the minimum font size to display for the specific user from a source from a group of sources consisting of: a configuration file, a user profile and an environment variable.

14. The at least one non-transitory computer readable-storage medium of claim 11 further storing computer executable instructions to perform the following additional step:
calculating a new size for each specific font in the specific view according to the following formula: new size of specific font=(original size of specific font/original smallest font size in specific view)*minimum font size to display for specific user.

15. The at least one non-transitory computer readable-storage medium of claim 11 further storing computer executable instructions to perform the following additional step:
maintaining and utilizing a plurality of separate minimum font sizes to display, wherein each separate minimum font size to display is associated with a separate user.

16. A computer system for customizing the size of content displayed by a web browser at a view-based level based on user preference, the computer system comprising:
a processor; and
system memory; comprising:
a receiving module to receive a minimum font size to display for a specific user;
a monitoring module to monitor retrieval of webpages by the web browser on a computer system, wherein a retrieved webpage comprises multiple views, wherein a view of a webpage comprises content to be displayed by the browser while at a current scrolled position in the webpage;
a resizing module to resize text in the specific view by examining all of the text in the specific view of the retrieved webpage and dynamically calculating font sizes for the text in the specific view of the retrieved webpage based on the minimum font size for the specific user, so that size proportionality between different font sizes in the specific view is maintained, and, as the specific user scrolls to additional views of the retrieved webpage, to resize text in specific additional views based on the minimum font size, prior to displaying each specific additional view; and
a displaying module to display the specific view of the retrieved webpage with the resized text to the specific user, and to display the specific additional views of the retrieved webpage with the resized text to the specific user.

* * * * *